June 2, 1964
S. L. KOUTZ ETAL
3,135,665
FUEL ELEMENT FOR A NEUTRONIC REACTOR
Filed July 31, 1961
2 Sheets-Sheet 1
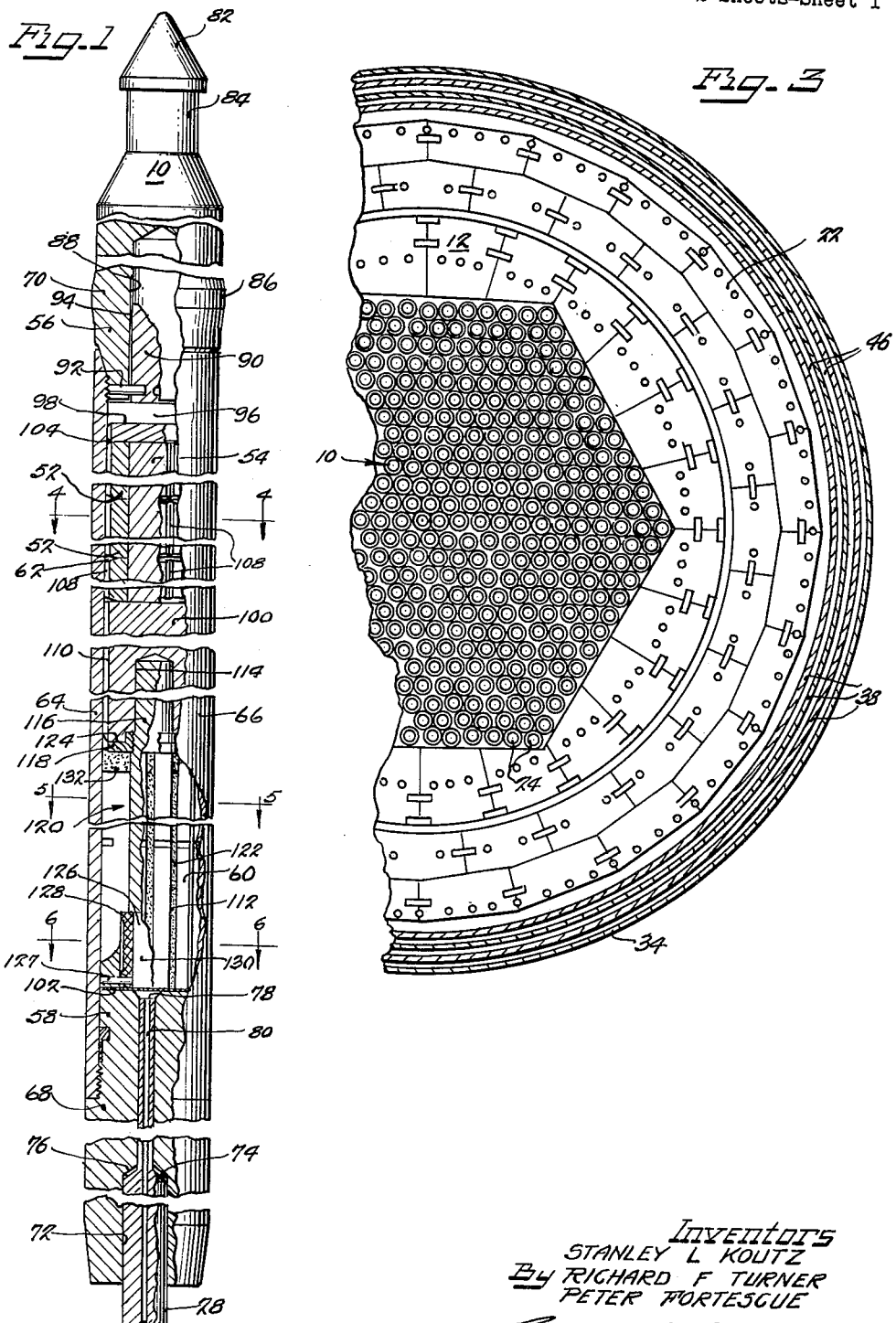
Inventors
STANLEY L. KOUTZ
RICHARD F. TURNER
PETER FORTESCUE
By Roland A. Anderson
Attys June 2, 1964

S. L. KOUTZ ETAL 3,135,665

FUEL ELEMENT FOR A NEUTRONIC REACTOR

Filed July 31, 1961

Inventors
STANLEY L KOUTZ
RICHARD F TURNER
PETER FORTESCUE

By

Attys

United States Patent Office 3,135,665
Patented June 2, 1964

3,135,665
FUEL ELEMENT FOR A NEUTRONIC REACTOR
Stanley L. Koutz and Richard F. Turner, San Diego, and Peter Fortescue, Rancho Santa Fe, Calif., assignors, by mesne assignments, to the United States of America as represented by the United States Atomic Energy Commission
Filed July 31, 1961, Ser. No. 128,275
4 Claims. (Cl. 176—71)

The present invention generally relates to fuel elements for neutronic reactors and more particularly relates to fuel elements for high temperature gas cooled neutronic reactors, which fuel elements include means for attenuating the migration of fission products therefrom.

Economy is a prime consideration in the generation of power by neutronic reactors operating by the well-known fission process. In this regard, it is important to obtain as high a degree of efficiency as possible in the transfer of heat from the reactor core under controlled conditions. Gas cooled neutronic reactors offer the possibility of increasing the thermal efficiency of heat transfer from the reactor core since the coolants do not limit the temperature of operation of the reactors, in contrast to liquid cooled reactor systems. At high operating temperatures of which the gas cooled neutronic reactors are theoretically capable, the thermal efficiency in transferring heat from the reactor core to the coolant is considerably increased. Various types of gas cooled neutronic reactors have been utilized heretofor for the generation of power and for other purposes. Examples of typical gas cooled neutronic reactors are set forth in U.S. Patent No. 2,827,429 to Binner et al., U.S. Patent No. 2,831,807 to McGarry, U.S. Patent No. 2,782,158 to Wheeler and U.S. Patent No. 2,714,577 to Fermi et al., as well as British No. 779,134 (issued July 17, 1957), and British Patent No. 789,022 (issued January 15, 1958).

The present invention relates to an improved fuel element for a gas cooled neutronic reactor, which fuel element provides a high degree of efficiency of heat transfer therefrom to a coolant. A plurality of such fuel elements are capable of operating efficiently in a neutronic reactor at high temperatures to provide high power density and the indicated high degree of heat transfer to a gaseous coolant. Moreover, the fuel elements are easy to assemble and disassemble and to align within the reactor core. The fuel elements have improved means for containment of fission products etc.

Accordingly, it is the principal object of the present invention to provide an improved fuel element for neutronic reactors. It is a further object of the present invention to provide an improved solid fuel element for a high temperature gas cooled neutronic reactor. Another object of the present invention is to provide a solid fuel element capable of operating efficiently in conjunction with a plurality of said elements to provide high power density and high efficiency of heat transfer therefrom to a gaseous coolant.

It is also an object of the present invention to provide an improved fuel element which minimizes the migration of fission products therefrom during operation of the fuel element. It is a still further object of the present invention to provide an improved fuel element for a high temperature gas cooled neutronic reactor which fuel element has improved means for aligning the fuel element within the reactor core. It is also an object of the present invention to provide an improved fuel element which is relatively simple to assemble and to disassemble.

Further objects and advantages of the present invention will be apparent from a study of the following detailed description and of the accompanying drawings of which:

FIGURE 1 is a schematic fragmentary side elevation illustrating certain features of a preferred embodiment of the fuel element of the present invention, portions being broken away to show the internal construction thereof;

FIGURE 3 is a schematic sectional view of the reactor core, taken along the section line 3—3 of FIGURE 2;

Figure 4:
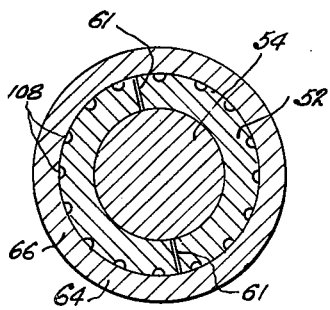
FIGURE 4 is a schematic sectional view of the fuel element taken along the section line 4—4 of FIGURE 1.
Figure 5:
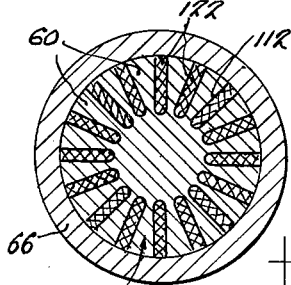
FIGURE 5 is a schematic sectional view of the fuel element taken along the section line 5—5 of FIGURE 1; and, FIGURE 6 is a schematic sectional view of the fuel element taken along the section line 6—6 of FIGURE 1.

The improved fuel element of the present invention includes an improved system for the controlled channeling of fission products into the primary coolant stream in the reactor core. In addition, the fuel element of the present invention employs an improved arrangement of components which facilitates assembly and disassembly thereof and alignment of the fuel element within the reactor core. More particularly, the fuel element includes a plurality of fuel compacts, the components of said compacts resisting fission product migration. The compacts are contained within a shell of moderator having a low permeability to the passage of fission products therefrom. The fuel element is constructed so that a purge of gaseous coolant passes therethrough at a very high flow rate to sweep fission products migrating from the fuel compacts into the lower portions of the fuel element, and particularly into an efficient internal fission product trap system. The fission product trap system during assembly thereof can be readily removed from the fuel element and inserted. The improvements in the fuel element cooperate to provide increased efficiency and safety of operation of the fuel element at high temperatures substantially in excess of 1800° F. over an extended period of time. A reactor core employing a plurality of the fuel elements has increased thermal efficiency and increased power density. It should be understood that the fuel element of the present invention can be adapted for use in conventional gas cooled neutronic reactors.

The fuel element of the present invention does not require the use of the usual metallic jacket or metallic fins or other extended surface areas in order to operate efficiently at temperatures in excess of 1800° F. In this regard, graphite or another thermal neutron moderator is used for single walled containment of the fuel, the moderator having low permeability to the passage of fission products therethrough.

The fuel compacts disposed within the fuel element are located in a central portion thereof between bottom and top reflector portions and each compact preferably comprises a mixture of fuel and moderator. Each of the compacts is disposed around a central supporting spine of moderator. The fuel in each compact preferably is in the form of a plurality of particles, each of which is coated with a substance which further retards the migration of fission products from the fuel.

Coolant gas is allowed to enter the fuel element in a controlled manner at a controlled flow rate and passes therethrough within a system of well-defined passageways so as to continuously scavenge fission products migrating from the fuel compacts and sweep them at a controlled flow rate to suitable fission product trap means located within the fuel element and preferably also located outside the reactor core. The arrangement described need not completely prevent any fission products from passing from the fuel element into the primary coolant system of the reactor. Instead, it is sufficient that the arrangement remove a large portion of such fission products from circulation and attenuate or slow down the passage of the fission products to prevent build-up thereof in the primary coolant circuit within and outside of the reactor core to an extent which would make maintenance of the reactor difficult or prevent its use in a safe manner over an extended period of time.

The fuel element and fission product trapping system are preferably vented to a zone of lower pressure in the primary coolant circuit to assure that transfer of coolant through the fuel element is inwardly from the higher pressure zone external from the fuel element in the reactor core. Coolant gas back-flow from the fuel element to the primary circuit is thereby avoided, so that leakage of volatile fission products to the primary coolant is prevented. A preferred point for such venting is one along the suction inlet to the gaseous coolant circulators of the primary coolant circuit.

Continuity of the scavenging flow of coolant through a plurality of the fuel elements of the present invention in the reactor core can be further insured by the use of one or more auxiliary gas circulators (not shown) located on the line which passes the scavenging flow to the primary coolant circuit.

Figure 2:
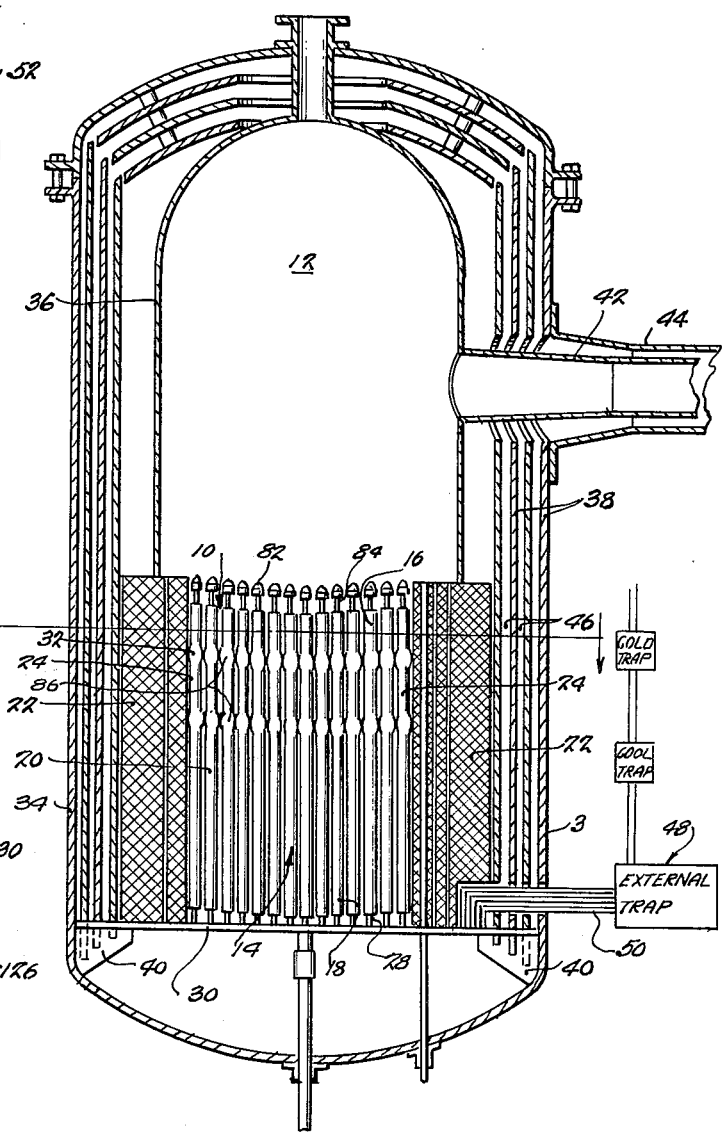
FIGURE 2 is a schematic vertical section of a gas cooled neutronic reactor incorporating fuel elements embodying various features of the present invention, portions of the reactor being shown in elevation.

Now referring more particularly to FIGURE 1 of the accompanying drawings, a preferred embodiment of the fuel element 10 of the present invention is illustrated. A plurality of such fuel elements 10 are also shown in FIGURE 2 uniformly spaced apart and generally vertically disposed within a typical gas cooled neutronic reactor 12. Such a neutronic reactor and reactor core 14 are more particularly described in co-pending application U.S. Ser. No. 23,341, filed April 19, 1960, of which Peter Fortescue, David C. Morse, and Lloyd R. Zumwalt are the inventors Relative heights of the individual fuel elements in the reactor core have been exaggerated to more clearly illustrate variations in the length of support means or stems in the core.

The reactor core 14 is generally in the form of a right cylinder surrounded by a reflector of neutron moderating material, such as graphite blocks, and comprising a top reflector 16 immediately above, and a bottom reflector 18 immediately below the active portion of the fuel elements and a side reflector 22 around the periphery of the fuel elements, as shown in FIGURE 2. The top and bottom reflectors form integral parts of the fuel elements. The side reflector may comprise, for example, a row of dummy fuel elements 24 formed of moderator and a concentric ring of moderator.

The core and fuel elements, as illustrated, particularly in FIGURE 3, are generally circular in cross-section, with the fuel elements uniformly spaced apart within the reactor in a geometrical pattern, i.e., equilateral triangles, as shown in FIGURE 2 a fuel element being at each end of each triangle. Spaces are provided between fuel elements to permit the flow of gaseous coolant (helium or other stable non-corrosive gaseous medium) therethrough. It will be understood that suitable control rods, not shown, are distributed throughout the reactor core in a suitable pattern for controlling the reactivity of the reactor core.

The fuel element support means or standoffs are disposed on a horizontally extending grid plate 30 and aid in radially aligning the respective fuel elements within the reactor core. Moreover, the fuel elements are provided with spacing means 32 disposed on the outer surfaces thereof, which means aid in maintaining the fuel elements properly spaced laterally from one another and also distribute the side loads for the fuel elements.

The grid plate is rigidly connected to a pressure vessel 34 which encloses the reactor core 14 and seals it from auxiliary equipment. A dome shaped plenum shroud 36 illustrated in FIGURE 2, is disposed above the reactor core with the lower end thereof supported on the upper surface of the reflector. A plurality of thermal shields 38 are disposed around and spaced from the sides of the reflector and from one another, the lower ends thereof terminating below the grid plate on supporting abutments 40.

As shown in FIGURE 2, an inlet tube 42 and a concentric outlet tube 44 provide access to and from the reactor vessel for the coolant gas which circulates between the reactor vessel, steam generators (not shown) and main circulators (not shown). Within the reactor vessel, the coolant circulates through the shields, side reflector, reactor core and plenum shroud. Suitable passageways 46 are provided within the side reflector and between the thermal shields for coolant gas circulation. Coolant purge gas passes to an external fission product trapping system 48 located outside the reactor core through suitable passageways 50.

Now referring more particularly to FIGURE 1 of the accompanying drawings, an elongated generally cylindrical single walled fuel element 10 is shown, portions being broken away to display the internal construction thereof. The fuel element comprises, in part, as shown in FIGURE 4, a plurality of fuel compacts 52 in the form of rings of size and shape commensurate with the requirements of the fuel element and the reactor core. The fuel compacts are stacked one upon another and are disposed around an elongated central support spine 54 located centrally and generally vertically within the fuel element. The spine affords easy assembly of the compacts therewith and permits accurate alignment of the compacts in the stack.

A top reflector region 56 of the fuel element is disposed above the spine and a bottom reflector region 58 of the fuel element is disposed below the spine, with an internal fission product trapping system 60 disposed within the bottom reflector region.

More particularly, each fuel compact is in the form of a ring which comprises an intimate mixture of nuclear fuel and neutron moderator. Preferably, the ring is split with, for example, a $\frac{1}{32}$ inch to $\frac{1}{8}$ inch gap between halves to prevent cracking of the sleeve when the sleeve contracts relative to the compacts. Graphite is the preferred moderator in the mixture in the compacts, but other suitable moderating material, such as, beryllium, beryllium-oxide, etc., may be used instead of the graphite. The fuel may comprise fissile material or a mixture of fertile and fissile material. Thus, for example, uranium-235 or plutonium can be used as fissile material and uranium-238 or thorium-232 may be used as fertile material. Where fertile material is present with fissionable material, additional fissionable material results through neutron capture by the fertile material during fissioning so that the fuel life is extended.

The relative proportions of fuel constituents and the total amount of such constituents within each fuel compact and within the reactor core will vary depending upon the requirements of the reactor. It is preferred that in each compact the fuel concentration, i.e., uranium-235 plus thorium-232 concentration be maintained at not more than 30 percent of the total weight of the fuel compact, with the moderator comprising the remainder. At any rate, the total amount of fuel in the assembled fuel elements in the reactor core should be sufficient to initiate and to sustain the desired fission reaction for the desired core life. The desired amount of moderator in each fuel compact will also vary according to the parameters of the reactor.

The following table sets forth a summary of a specific megawatt electrical power reactor of the gas cooled high temperature type employing the fuel element of the present invention.

TABLE I

*Technical Data for the High-Temperature Gas-Cooled Reactor*

| | |
|---|---|
| Reactor power | 115 mw. thermal energy. |
| Effective core diameter | 9.16 ft. |
| Active core height | 7.5 ft. |
| Number of fuel elements | 804. |
| Number of control rods | 36. |
| Number of emergency shut-down rods | 19. |
| Initial fuel loading | 184.8 kg. enriched uranium (173.3 kg. U-235). |
| Initial thorium loading | 1987 kg. |
| Initial boron burnable poison loading | 950 g. |
| Initial rhodium loading | 5 kg. |
| C/Th/U atom ratio: | |
| 696 fuel elements with | 2126 C/9.57 Th/1.0 U. |
| 108 fuel elements (outside ring) with | 3511 C/15.94 Th/1.0 U. |
| Average moderator temperature | 900° C. |
| Average fuel compact temperature | 1200° C. |
| Maximum fuel compact temperature | 1500° C. |
| Initial thermal neutron flux | $4.01 \times 10^{13}$. |
| Initial total neutron flux | $16.55 \times 10^{13}$. |
| Initial conversion ratio | 0.563. |
| Average conversion ratio | 0.612. |
| Final conversion ratio | 0.704. |
| Fuel life at full power | 900 days. |

The size of each fuel compact containing the fissionable and fertile mixture compacted with moderator is preferably kept small to facilitate handling, etc. For example, the fuel compact may be a ring, preferably a split ring with a gap 61. The ring may be about 1⅛ inches long and about ⅜ inch thick, i.e., with an outside diameter of about 2¾ inches and an inside diameter of about 1¾ inches. By concentrating the fuel in an annular ring, the maximum fuel temperature is lowered in contrast to an arrangement in which the fuel is homogeneously mixed with moderator and disposed throughout a volume equal to that of the ring plus the portion of the central spine encompassed by the ring.

Each of the plurality of fuel compacts is preferably bevelled along the upper and lower margins of the periphery thereof, for example, a 10° bevel, so that when the plurality of compacts are stacked on the central spine, i.e., one upon the other, the adjoining bevelled areas provide annular horizontally extending grooves or passageways 62 for circulation of gaseous coolant in intimate contact therewith, as particularly described hereinafter.

The ring shaped compacts are adapted to be slidably disposed on the central vertically extending cylindrical solid moderator spine 54, which is preferably graphite and which has a diameter approximately that of the internal diameter of the compacts, e.g., 1¾ inches. The active fuel portion of the fuel element may be about 90 inches in length with the total fuel element length, including the internal trap and upper and lower reflector portions, approximately 144 inches.

In the fuel compacts, the mixture of fertile and fissile material is present preferably as carbide and in the form of particles of controlled size. Thus, in this connection, thorium-232 and uranium-235 are present as the carbides and the particle size therefor is usually between about 200 and about 400 microns, preferably between about 200 and about 300 microns. Each particle is preferably pre-treated by coating in any suitable manner with a suitable moderator, preferably pyrolytic carbon, although other moderators such as beryllia, graphite, etc., can be utilized. The particle coating is preferably from about 50 to about 75 microns. Thus, the coating can be sprayed, painted, dipped, etc., and can be subjected to additional steps designed to further adhere the coating to the fuel particles. Any conventional pyrolytic carbon coating process can be utilized.

The coating of moderator, particularly pyrolytic carbon, about each fuel particle has the effect of decreasing the rate of migration of fission products from the fuel. Accordingly, it aids in the overall control of fission products within the fuel element.

As previously indicated, thermal neutron moderator is intimately mixed with the carbide particles of the fissionable (and fertile material when present) in forming the fuel compacts. The micron size of the fuel particles is controlled so that a sufficient amount of moderator is disposed between the fuel particles to reduce radiation damage to the moderator by recoiling fission products. Graphite is the preferred moderator in the fuel compacts but other suitable moderator material such as beryllium, beryllium oxide, etc. can be utilized in addition thereto or in place thereof.

Formation of the ring compacts can be carried out in any suitable manner. For example, each ring compact can be formed by a cold pressing operation followed by a warm pressing and sintering operation. In this regard, the particulate fuel in a suitable mixture can be mixed with graphite, a plasticizer such as ethyl cellulose, a binder, preferably pitch (although furfuryl alcohol, polyethylene and phenol-formaldehyde resins can be used, as well as other binders). A binder vehicle may also be present to facilitate the mixing and to aid in the distribution of the binder. Thus, for example, pitch can be used as the binder with trichlorethylene or benzene as the vehicle.

The fuel particles in such a procedure may be present initially, for example, as uranium oxide and thorium oxide. The process is carried out not only to form the compact in desired shape, but to also effect conversion of the fuel oxides to fuel carbides. The graphite powder and pitch binder may be used in a suitable ratio, for example, about 9:1, and about 1 percent of the plasticizer may be added and about 7 cc. of trichlorethylene per gram of pitch.

The fuel particles in oxide form, graphite flour or powder and the plasticizer may be blended together, dried and granulated in a suitable blender and then the binder-vehicle mixture may be added thereto with mixing. A thorium-to-uranium weight ratio may be maintained at, for example, from about 2 to 1 to about 11 to 1 in the mixture. The granules thus produced are oven treated at about 150° F.

After the mixing operation, the compact is formed by cold pressing the formed granules. The cold pressing operation comprises the application of a pressure usually between about 40,000 and about 50,000 p.s.i. to the mixture in a die. The cold pressing operation is usually followed by a warm pressing step carried out at temperatures up to about 800° C., preferably about 750° C. and pressures usually over about 2000 p.s.i. The warm pressing can be carried out in graphite dies in a furnace heated by induction coils or the like or, alternatively, the compacts can be heated by passing electrical currents therethrough. Other suitable methods of heating can be employed.

The compacts are usually molded to final dimensions so that they do not require machining. They can be split, if desired, and sintered. The sintering operation is carried out at a temperature of usually about 2000° C. or more to convert the oxides to carbides to provide the finished compacts.

It has been found that in order to retain the integrity of the moderator coating on the fuel particles (where such coating is used) it is preferred to form the fuel compacts in an improved manner, as follows: The moderator (pyrolytic carbon) coated particles of carbide fuel are first mixed with the plasticizer, binder, such as pitch, the vehicle for the binder and the graphite flour in the manner previously indicated, and then the mixture is dried and granulated to suitable size. Subsequently, instead of a cold pressing operation followed by sintering, as previously described, a warm pressing operation is carried out to provide the finished compact.

The described improved procedure has fewer steps than the first described procedure and is believed to produce, generally speaking, an even more satisfactory product. By using graphite flour bonded with a minimum of binder for the fuel matrix material, graphitizing temperatures are not required to produce compacts containing appreciable percentages of graphite. Usually, only about 10 weight percent pitch binder is initially required and, after the warm pressing operation, only about 5 percent of that remains so that a high density matrix of 95 percent by volume of graphite and only 5 percent of carbon is provided.

The mixing, granulating and the warm pressing operations are carried out generally as previously described in connection with the first described procedure. Thus, graphite dies are preferably employed for the warm pressing with heating effected as previously described. As a preferred technique, the granulated fuel mixture can be placed in the graphite dies and a pressure of about 1000 p.s.i. exerted thereon. The temperature of the mixture is raised at about 50° per minute to 250° C., whereupon the pressure is increased to about 2000-2450 p.s.i. The temperature may thereafter be raised to 750° C. at 50° per minute and held for five minutes. When a metal backing is not used with the dies, additional time is required for heating. Compacts to be split can be warm pressed in split form, if desired, or split subsequently.

Following the warm pressing operation, the compacts, in accordance with the second procedure, are usually given a stabilizing heat treatment to complete the removal of volatiles and to minimize dimensional changes which might occur on subsequent treatment. This heat temperature can be carried out at graphite temperatures, for example, 2000° C. or any other suitable temperatures, preferably one which the compacts will encounter during normal operation of the fuel element in the reactor core.

The finished fuel compacts have few passageways between voids, that is, are as dense as practical, are stable, strong and dimensionally accurate. They are capable of withstanding temperatures of the order of 3000° F. over extended periods of time.

The graphite central spine 54 can be fabricated in any suitable manner to provide a durable solid piece of suitable size and shape (usually cylindrical). Preferably, a poison, such as rhodium 103 which has suitable resonance bands to contribute to the production of a negative temperature coefficient of reactivity for the reactor, is mixed with the graphite during fabrication of the spine.

The plurality of ring compacts (split or unsplit) are assembled around the central spine of moderator, in accordance with the foregoing, and disposed within the outer container 64 of the fuel element. In the event split compacts are used, no vertical alignment of the gaps 61 of the respective compacts need be made. This outer container or fuel can is largely fabricated of a low permeability moderator having a sleeve or side wall 66 sufficiently thick to provide a low permeation coefficient to substantially resist the passage therethrough of fission products. Thus, the moderator has a helium permeability of not more than about $5 \times 10^{-4}$ cm.$^2$/sec. at room temperature and preferably less than about $1 \times 10^{-5}$ cm.$^2$/sec. The side wall 66 of the can 64 may be relatively thin, for example, approximately 0.36 inch, i.e., the outer diameter may be approximately 3.50 inches with the inner diameter approximately 2.75 inches, and still provide adequate containment of the fuel and fission products.

The side wall of the fuel can is connected at the bottom thereof to a support coupling 68 fabricated of low permeability moderator, such as graphite, and is sealed at the top thereof to a top reflector block 70 comprising porous graphite or other porous moderator material which, in addition to serving as the upper reflector region, serves as a gas inlet to the interior of the container.

Graphite is the preferred moderator material for the fuel can in view of its high temperature physical, mechanical and nuclear properties. However, the usual grades of graphite are wholly unfit for use in the containment of fission products, inasmuch as they are relatively permeable or porous, readily permitting the passage therethrough of fission products.

Accordingly, it is necessary to treat the graphite in a manner which densifies it, closes or fills the pores thereof or coats or impregnates it so that the permeability thereof is substantially reduced. Coating, impregnating, vapor plating, hot dipping, spraying, firing, and other suitable operations are known in the art. By such manipulations, treated graphite can be prepared which has the indicated low permeability to fission products, even at temperatures in excess of 2000° F. Examples of graphite impermeabilizing techniques, such as may be employed, are specified in co-pending U.S. applications, Serial No. 784,064, to Goedell et al., filed December 31, 1958, now Patent No. 3,031,389, and Serial No. 784,071 to Goedell et al., filed December 31, 1958, now Patent No. 3,001,238.

Coatings applied to the graphite should be integrated therewith to prevent cracking from the graphite during use. Thus, the coating should securely physically and/or chemically bond to the graphite and should preferably permeate down through the graphite in a suitably thick diffusion zone to minimize damage due to differential thermal expansion during high temperature heating.

In assembling the can 64, the side wall 66 is screwed into the bottom coupling 68 and in addition the coupling is preferably brazed to the side wall with zirconium or the like, to render it as impermeable to fission products as the coupling and the sidewall themselves.

A vertically extending metallic stand-off 28 connected to the reactor grid plate 30 is received within a cavity 72 in the coupling, as illustrated in FIGURE 1. The standoff is fabricated of any suitable metal, such as stainless steel, and the stand-off and cavity are relatively long, about 10 inches, so that the fuel element when fitted over the stand-off can stand alone in a vertical position in the reactor core. At room temperature, the seat 74 of the coupling rests on or approximates the shoulder 76 of the stand-off.

Moreover, since the stand-off is metallic and the coupling is low permeability moderator, preferably graphite, as the temperature of the stand-off and the coupling increases in the reactor core, the stand-off expands in diameter at a greater rate than the coupling to reduce the gap between the cavity wall and the surface of the stand-off. Accordingly, helium leakage is reduced to a low rate, only about 10 percent of the purge flow into the fuel element. In addition, back-diffusion of fission products from the fuel element is minimized in the coupling stand-off region by the length of the cavity. The cavity extends inwardly to a suitable screen fabricated of a suitable metal, such as zirconium. The upper end 78 of the stand-off when the fuel element is disposed on the stand-off approximates the bottom end of the internal fission product trap 60, as shown in FIGURE 1, so that fission products passing from the trap in purge gas can readily pass into a central passageway 80 in the stand-off and exit the fuel element 10.

The top reflector block 16 of the fuel element forming the upper part of the fuel can is comprised of a moderator material having a higher permeability than the low permeability sidewall and coupling. Such higher permeability material is preferably normal graphite having the usual permeability. The top reflector is screwed to the upper end of the sidewall, as shown in FIGURE 1, and the joint therebetween is sealed, as by carbonaceous sealing material.

The top reflector block terminates in a pointed head 82. A narrowed neck 84 is provided immediately below the head. The head and neck are readily engageable by a grappling means (not shown) so that the fuel element can be readily moved to and from the reactor core. Moreover, the diameter of the fuel element is preferably slightly enlarged in a portion designated by the numeral 86 in the top reflector block region, the enlargement serving as a means for laterally spacing the fuel element in the core. Moreover, additional spacing means (not shown) may also be provided at spaced intervals along the external surface of the sidewall and/or top reflector block to further assist in positioning the fuel element laterally within the core. Each region of expanded diameter preferably has a diameter only slightly greater than the diameter of the unexpanded areas of the fuel element, for example, a diameter of about 3.535 inches instead of about 3.500 inches for the remainder of the fuel element. Gas pressure around the periphery of the side reflector of the reactor core provides lateral force to hold a plurality of fuel elements in position in the reactor core.

As illustrated in FIGURE 1, the central portion of the top reflector block is provided with a cavity 88 which is substantially filled with a plug 90 fabricated of moderator material, such as graphite, which plug is held in position by a pin 92, as indicated in FIGURE 1. The diameter of the plug is slightly less than that of the cavity so as to provide a central purge gas entrance passageway 94 down through the top reflector block 70, by means of which helium coolant passing inwardly through the porous top reflector block is channeled down into lower portions of the fuel element. The purge gas entrance passageway 94 terminates at its upper end adjacent the top of the top reflector block 70 and its lower end in an annular space 96 between the bottom of the top reflector block and plug and the upper surface of a cylindrical cap fabricated of low permeability moderator, such as graphite, to reduce fission product migration from the stack of fuel compacts 52 disposed around the spine 54, upon which the cap rests within the can 64. The cap also provides thermal shielding for the bonded joint between the top reflector block and can sidewall.

The stack of vertically aligned fuel compacts 52 disposed around the vertically extending spine 54 as illustrated in FIGURE 1, is slidably supported within the can 64 on a lower reflector block 100. The lower reflector block 100 rests on the top of the fission product trap 60, the bottom of which trap is slidably supported within the can on a particle screen 102 slidably disposed on the top surface of the previously described support coupling 68, as indicated in FIGURE 1. Accordingly, the screen 102, trap 60, lower reflector block 100, compacts 52 and spine 54, and cap 98 are slidably disposed in vertically aligned stacked relation within the can 64 and are generally cylindrical to conform to the cylindrical sidewall of the can.

More particularly, the cap 98 is provided with a taper at the uper and lower margins thereof around its periphery so as to form annular grooves 104 for circulation of purge gas. Moreover, the cap is provided along the periphery thereof with a plurality of vertically extending grooves formed in the periphery thereof and adapted to mate with a plurality of similar vertical grooves 108 disposed in the periphery of each of the plurality of compacts, as shown in FIGURE 4. In addition, the lower reflector block 100 is provided along its periphery with mating vertical grooves 110. Vertical purge gas passageways are thus provided from the annular space 96 downwardly through vertical grooves extending from the cap to the fission product trap. The indicated grooves mate with corresponding vertically extending channels 112 in the fission product trap. Purge gas can sweep fission products migrating from the compacts downwardly directly into the fission product trap for retention therein.

As previously indicated, the annular passageways 62 formed by the adjoining tapered margins of stacked compacts provide for adequate distribution of the purge gas over the surface of the fuel compacts in order to more efficiently remove fission products migrating from the fuel. These passageways 62 intersect the vertical passageways formed by the previously described vertical grooves, so that the fission products can pass down into the trap. This uniform network of purge gas passageways directly on the surface of the fuel is highly effective in controlling fission product migration in the fuel element.

Now referring again to FIGURE 1, the lower reflector block 100 can be formed of moderator of the usual permeability, such as normal graphite and is provided with a centrally disposed cavity 114 extending up from the bottom surface thereof and adapted to receive a vertically extending cylindrical lift arm 116 of the fission product trap 60. The lift arm facilitates insertion of the trap into and removal of the trap from the can. The lift arm 116 fabricated of moderator, preferably normal permeability graphite, is threaded adjacent its lower end to receive a threaded trap nut 118, also fabricated of moderator, preferably normal permeability graphite. The trap nut is dimensioned so that it can be screwed down over the top of the main body 120 of the fission product trap 60, as shown in FIGURE 1, to cover only the major portion of each of the fission product trap channels 112, thus reducing danger of loss of trapping agent 122 from the channels during handling of the trap 60. The trap nut is sufficiently small in diameter so that the outer portions of the trap channels are left exposed for mating with the lower reflector block grooves. The bottom end 124 of the lower reflector block 100 is dimensioned and shaped to seat directly over and extend around the trap nut 118, as shown in FIGURE 1.

The main body of the fission product trap is generally cylindrical, is formed of normal permeability moderator, preferably normal permeability graphite, and may be, for example, about 12 inches long, with channels 112 extending radially inwardly, so as to provide substantial space for the trapping agent 122 disposed therein. Channels 112 extend from the upper surface of the main body 120 down to a short distance (1 or 2 inches) from the bottom thereof. A centrally disposed cavity 126 is provided in the lower end of the main body, which cavity is dimensioned so as to extend up into contact with at least the lower ends of channels 112.

Figure 6:
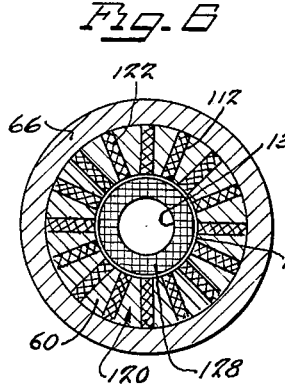

A porous graphite or other moderator plug 128 suitably dimensioned, substantially fills the cavity 126 and is held in place by a pin 127. The plug is provided with a central passageway 130, as shown in FIGURE 6, which extends into contact with the particle screen 102, upon which the trap is disposed, and passageway 80 in the standoff 28 when the fuel element 10 is seated on the standoff. Accordingly, purge gas containing fission products passes into the channels 112 and down therethrough, and exits the channels by passing through the plug 128. It passes into the passageway 130, through particle screen 102 and into and through passageway 80 exiting the fuel element to external fission product traps 48 through line 50, etc.

The particle screen 102 may be formed of any suitable high temperature screening material, such as stainless steel mesh or the like, and is utilized to hold back particulate trapping agent 122 which may have become entrained in the purge gas.

The fission product trapping agent may be any suitable agent, such as porous graphite particles, coated with or otherwise mixed with a suitable electro-positive element, preferably silver or copper. The upper ends of the channels may be packed with a suitable high temperature packing material 132, such as quartz wool or the like to prevent loss of the trapping reagent from the channels during handling of the trap. The trap nut 118 is screwed down thereover to hold the quartz wool in position to further aid in retaining the trapping agent in the channels 112.

The fission product trap operates to convert certain volatile fission products to less volatile form. Since it is located in the cooler lower region of the fuel element, it is particularly effective in this respect. It can operate at a suitable temperature, for example, about 800° F., to remove selenium, bromine, rubidium, strontium, cadmium, antimony, tellurium, iodine, cesium, barium, samarium and europium, among other elements. Arsenic, silver and indium tend to condense in the purge channels before reaching the trap. As much as 90 percent or more of fission products having half lives of less than 1 hour are retained in the fuel compacts and of those having half lives of about 1 day as much as 50 percent or more are retained in the compacts. The fission product trap effectively reduces a substantial proportion of the remainder.

The fission product trap in one embodiment comprises a cylinder approximately 12 inches long and having a diameter approximating the internal diameter of the can. Such trap has 16 grooves extending inwardly radially from the outer periphery thereof and matching, as previously described, corresponding vertical grooves in the lower reflector block. The vertical grooves in the fission product trap are filled with a suitable agent comprising activated charcoal (approximately 150 grams) in finely divided form to provide a specific surface area of 1500 $m.^2$ per gram. The charcoal is impregnated with about 50 grams of metallic copper or silver in finely divided form. The metal is present on the outer surface of the charcoal in flakes and is deposited in the pores thereof.

Copper impregnated activated charcoal trapping agent can be prepared by soaking the indicated amount of activated charcoal for about 2–3 days in an alcoholic solution containing a sufficient amount of copper nitrate to yield the indicated amount of copper in the finished agent. The solution, if in excess, is then drained from the charcoal and the charcoal is dried at 100° C. in vacuum, baked at 300° C. to decompose the copper nitrate to copper oxide, and treated with hydrogen at about 500° C. to convert the copper oxide in the agent to the metallic form by reduction. A second soaking after the first drying increases the copper concentration to above 30 weight percent, as high as 50 weight percent.

When silver is utilized as the electropositive metal with the activated charcoal, it is preferred to deposit it on the charcoal from an ammoniacal silver acetate solution, then convert it from the acetate to oxide and reduce it to the free metal in the manner described for the copper. In the finished trapping agent for the fission product trap, the metal, whether copper or silver or other metal, can thus be present in an amount up to about 50 percent by total weight of the reagent.

It will be understood that the absorbent used in the trapping agent may, if desired, be other than or in addition to activated charcoal. For example, activated alumina may be utilized.

With regard to the action of the agent in the fission product trap on those fission products reaching the trap in the purge gas stream, selenium, bromine, tellurium and iodine tend to react with the metallic copper, forming low volatility copper selenide, copper bromide, etc. Cesium and rubidium react strongly with activated charcoal, whereby they are chemisorbed or otherwise chemically combined with the charcoal. This results in a very low vapor pressure for these elements over activated charcoal. For example, at 800° F., an equilibrium cesium vapor pressure of about $10^{-8}$ atmospheres occurs at cesium loadings of one-half gram per gram of charcoal. Accordingly, cesium and rubidium fission products show little tendency to be swept past the internal fission product trap.

Copper iodide and copper bromide are somewhat volatile and show some tendency to pass through the trap after they are formed from fission product iodine and bromine. However, such passage times are long, of the order of 100 hours or more. Silver iodide and bromide are less volatile than the corresponding copper salts, and tend to be delayed even longer in the trap.

Cadium passes through the trap with some delay. However, due to its low fission yield, cadium does not contribute substantially to overall fission product activity.

Elemental barium, strontium, samarium, and europium tend to condense in the purge channels and in the trap. Barium, strontium, samarium and europium which react in the gas phase with residual carbon monoxide which may be present in small amounts (about 10 p.p.m.) in the helium purge gas, tend to form oxide aerosol which are not readily trapped.

However, barium, strontium, samarium, and europium also tend to react with chemisorbed oxygen on graphite and activated charcoal surfaces of the trap and in such event tend to adhere to such surfaces.

Antimony tends to readily condense in the trap if it does not condense earlier, i.e., in purge channels etc. In any event, antimony is not very important because of its relatively low concentration with respect to total fission product yield.

Accordingly, the internal fission product trap 60 delays migration of a substantial proportion of the fission products for a substantial period of time. It will be understood that the fuel element 10 can be constructed with other internal fission product traps, such as those disclosed in U.S. Patent No. 3,010,889, P. Fortescue et al., issued November 28, 1961, and entitled Fuel Element, in place of trap 60. Moreover, the internal fission product trap could be omitted. However, use of an internal trap, such as trap 60, is preferred.

In assembling the fuel element, the sidewall 66 can first be connected, as previously indicated, to the support coupling 68, the particle screen 102 can then be installed. The assembly can then be turned on its side and the assembled fission product trap, with the trapping agent 122 substantially filling channels 112, with the packing material 132 filling the top of each channel, and with the trap nut 118 screwed down on the lift arm, can be slid into place adjacent the particle screen, by means of the lift arm 116. Thus, the lift arm serves as a means for securing the trap nut in place and also as a means for readily handling the fission product trap, i.e., inserting it and withdrawing it from the fuel element. The fission product trap can later be readily removed and replaced, if necessary.

The lower reflector block 100 is then seated over the lift arm and trap nut. Thereafter, the central spine 54 with the plurality of compacts 52 in place therearound is seated upon the upper end of the lower reflector block. The cap 98 thereupon is placed on the top end of the spine and uppermost compact and the top reflector block 70, with its centrally disposed plug 90 in position, is secured to the upper end of the sidewall 66, as by screwing, plus cementing, etc. to complete the assembly of the fuel element. The fuel element is then positioned on the stand-off, as previously described, in the reactor core.

Accordingly, improved means are provided for the easy assembly and dissembly of fuel element components. Moreover, improved means are provided for the channeling of purge gas containing fission products, from the active region in the fuel element to an effective internal fission product trap for removal therefrom. The tapered upper and lower edges of each fuel compact provide lateral grooves in combination with the vertically extending grooves for circulating the purge gas in a controlled pattern effectively throughout the surface area of the fuel compacts for the most efficient removal of fission products.

Fission products which remain in the purge gas pass therewith through the stem of the standoff out of the fuel element and into suitable external fission product traps. The purge gas is effective in removing fission products which have migrated from the fuel compacts because of the high flow rate of purge gas through the fuel element, approximately 1.1 pounds per hour. In a typical reactor, there may be 804 fuel elements, through which 900 pounds of helium per hour are drawn as a purge stream.

Fission products which pass from the internal fission product trap channels 112 pass to external fission product traps 48, schematically illustrated in FIGURE 2. Thus, for example, the traps may be one or more chemical and/or physical traps. In this regard, the external fission product traps may comprise a plurality of physical traps in the form of activated charcoal delay beds operating at various low temperatures down to the temperature of liquid nitrogen to delay, trap, condense and remove the remaining fission products from the helium purge stream. The purified helium or other gaseous coolant stream then can be returned to the main coolant circuit for reuse.

Table II illustrates a typical fuel element in accordance with the present invention and having the following dimensions:

TABLE II

*Typical Dimensions of Fuel Element 11*

| | Inches |
|---|---|
| Fuel compact outer diameter | 2.750 |
| Fuel compact inner diameter | 1.750 |
| Spine diameter | 1.750 |
| Fuel compact length | 1.125 |
| Total length of fuel compacts | 90.00 |
| Can sidewall thickness | 0.375 |
| Fuel element diameter | 3.500 |
| Fuel element length | 144.00 |
| Top reflector length | 27.00 |
| Bottom reflector length | 27.00 |
| Internal trap length | 12.00 |
| Internal trap channel length | 11.00 |
| Internal trap channel width | 0.125 |
| Internal trap channel depth | 0.812 |

Accordingly, an improved fuel element is provided which is constructed to provide a flow of coolant purge down from the top thereof into contact with the surface of the fuel therein and then to improved fission product traps, internal and external, for delay and removal of fission products entrained in the purge gas. Moreover, the fuel compacts of the fuel element resist fission product migration, due to their improved construction. In addition, the internal fission product trap is of improved design. Accordingly, inhibition of the migration of fission products from the fuel element into the main coolant stream is accomplished in a highly effective manner.

The fuel element of the present invention also has improved features of simplicity of construction, assembly and disassembly, and is capable of operating over extended periods of time without breakdown and without fission product build-up in the primary coolant circuit. Since the reactor core is capable of operating at temperatures of 2000° F., heat transfer from the fuel elements to the surrounding coolant gas is carried out in an improved manner. Wigner stored energy effect and growth problems can be avoided since the usual radiation effects of the fuel on the graphite moderator are continually annealed at the high operating temperature.

It will be appreciated that other advantages are set forth in the foregoing.

Various of the features of the present invention are set forth in the appended claims.

What is claimed is:

1. A fuel element for a neutronic reactor, said fuel element comprising a single walled fuel container fabricated of neutron moderating material having a low permeability to fission products, said container also having an upper porous gas inlet region containing a central purge gas entrance passageway communicating with the interior of said container, said container also including a purge gas outlet located at the lower end thereof, a plurality of split ring fuel compacts having a thermal expansion gap between halves of the ring disposed in vertically stacked relation around a vertical central spine of neutron moderating material within said container, each of said compacts being fabricated of a mixture of fuel particles and particles of neutron moderating material, each of said fuel particles having a protective coating of pyrolytic carbon bonded thereto, each of said compacts having beveled upper and lower margins along the periphery thereof to provide in stacked relation transverse purge gas passageways, each of said compacts having around the periphery thereof a plurality of vertical grooves, said grooves being aligned regarding the respective compacts to provide along the vertical length of said stack of compacts vertical purge gas passageways which said transverse passageways intersect, an end cap fabricated of neutron moderating material having a low permeability to fission products disposed on the upper end of said stack of compacts, said cap including a plurality of grooves matching the grooves of said compacts, the upper end of said cap being disposed within said container in a manner to provide a purge gas space communicating with said purge entrance passageway, a removable fission product trap disposed below and spaced from said stack of compacts by an interposed region of neutron moderating material and including a plurality of radial vertically extending cavities in communication with said purge gas passageways, whereby purge gas passing from the surface of said compacts is directed to the fission product trap cavities, said cavities containing a fission product trapping agent, the bottom portion of said trap being in communication with said gas outlet, whereby purge gas can pass from said fuel element.

2. A fuel element for a neutronic reactor, said fuel element comprising a single walled fuel container fabricated of neutron moderating material having a low permeability to fission products, said container also having an upper porous gas inlet region containing a central purge gas entrance passageway communicating with the interior of said container, said container also including a gas outlet located at the lower end thereof, a plurality of annular fuel compacts disposed in stacked relation around a vertical central spine of neutron moderating material within said container, each of said compacts being provided around the periphery thereof with a plurality of spaced grooves, said grooves being aligned regarding the respective compacts to provide purge gas passageways along the length of said stack of compacts, an end cap fabricated of neutron moderating material having a low permeability to fission products disposed on the upper end of said stack of compacts, said cap including a plurality of grooves matching the grooves of said compacts, the upper end of said cap being disposed within said container in a manner to provide a purge gas space communicating with said purge entrance passageway, a removable fission product trap disposed below said stack of compacts and including a plurality of radial vertically extending cavities in communication with said purge gas passageways, whereby purge gas passing from the surface of said compacts is directed to said fission product trap cavities, each of said cavities containing a particulate fission product trapping agent and overlying packing material, a vertically extending lift arm connected to the upper surface of said trap, a trap nut disposed around and releasably secured to said lift arm and abutting the upper surface of said trap, said nut overlying at least a portion of each of said cavities, whereby said packing material and fission product trapping agent are retained within said cavities, said lift arm and nut being fabricated of neutron moderating material, the bottom portion of said trap being in communication with said gas outlet.

3. A fuel element for a neutronic reactor, said fuel element comprising a single walled fuel container fabricated of graphite having a low permeability to fission products, said container having an upper porous gas inlet region and a gas outlet located at the lower end thereof, a plurality of annular fuel compacts disposed around a vertically extending central spine of graphite within said container, said stack of compacts being spaced from a fission product trap in communication with said outlet, each of said compacts being provided around the periphery thereof with a plurality of vertical grooves, said grooves being aligned regarding the respective compacts to provide purge gas passageways along the length of said stack of compacts, said fission product trap including a plurality of radial vertically extending cavities communicating with said purge gas passageways, whereby purge gas from the surface of said compacts is directed to the fission product trap cavities, said cavities containing particulate fission product trapping agent comprising particulate carbon coated with an electro-positive element, and packing material disposed above said trapping agent, said fission product trap also including a lift arm connected to the upper surface of said trap and adapted to facilitate insertion and removal of said trap from said container, and a trap nut disposed around and releasably connected to said lift arm and abutting the upper surface of said trap, said nut overlying at least a portion of the upper end of each of said cavities so as to hold said packing material in place, thereby retaining said trapping agent within said cavities, said trap, lift arm and nut being fabricated of graphite, the lower end of said trap including a centrally disposed purge gas collecting passageway in communication with said gas outlet, and a metallic particle screen disposed between said collecting passageway and said gas outlet.

4. A fuel element for a neutronic reactor, said fuel element comprising a single walled fuel container fabricated of graphite having a low permeability to fission products, said container also having an upper porous graphite gas inlet region containing a centrally disposed purge gas entrance passageway communicating with the interior of said container, said container also including a purge gas outlet located at the lower end thereof, a plurality of split ring fuel compacts having a vertical expansion gap between halves of the ring disposed in vertically stacked relation around a central spine of graphite within said container, each of said compacts being fabricated of a mixture of fuel particles and particles of graphite, each of said fuel particles having a protective coating of pyrolytic carbon bonded thereto, each of said compacts having beveled upper and lower margins around the periphery thereof and also a plurality of spaced vertical grooves, the beveled margins of said stack forming transverse purge gas passageways, the grooves of the respective compacts being aligned to provide vertical purge gas passageways along the length of said stack of compacts intersecting said transverse passageways, an end cap fabricated of low permeability graphite disposed on the upper end of said stack of compacts, said cap having a plurality of vertical spaced grooves matching and aligning with the grooves of said compacts, said cap being disposed within said container in a manner to provide a purge gas space communicating with said purge entrance passageway, whereby purge gas passing down through said purge entrance passageway into said purge gas space is channelled down said vertical passageway along the surface of said cap and stack of compacts, a removable fission product trap fabricated of graphite and disposed below and spaced from said stack of compacts by an interposed lower reflector block fabricated of graphite, said lower reflector block having a plurality of vertical spaced grooves matching the grooves of said compacts, and said trap having a plurality of radial vertically extending cavities from the upper surface thereof in communication with the vertical purge gas passageways, whereby purge gas is directed from said compacts to said fission product trap cavities, said cavities containing a particulate fission product trapping agent comprising particulate carbon coated with a metallic electropositive element, said agent being overlaid with a packing material, a lift arm vertically extending from the upper surface of said trap to facilitate insertion and removal of said trap from said fuel element, a trap nut disposed around and releasably secured to said lift arm and abutting the surface of said trap, said nut overlying at least a portion of each of said cavities so as to retain said packing material and trapping agent within said cavities, said trap and said nut being fabricated of graphite, the bottom portion of said trap being provided with a centrally disposed purge gas collecting passageway communicating with said gas outlet, a metallic particle screen being interposed between said collecting passageway and said outlet, the lower end of said container having a centrally disposed cavity extending upwardly therein forming at least part of said gas outlet and adapted to receive a stand-off for vertical alignment and self-support of said fuel element within a nuclear reactor core.

References Cited in the file of this patent
UNITED STATES PATENTS

| | | |
|---|---|---|
| 2,982,712 | Heckman | May 2, 1961 |
| 3,010,889 | Fortescue et al. | Nov. 28, 1961 |

FOREIGN PATENTS

| | | |
|---|---|---|
| 850,015 | Great Britain | Sept. 28, 1960 |